Patented Nov. 18, 1952

2,618,601

UNITED STATES PATENT OFFICE 2,618,601

LUBRICANT CONTAINING A DIMETHYL SILICONE POLYMER AND A TRIALKYL PHOSPHATE

Douglas H. Moreton, Pacific Palisades, Calif., assignor to Douglas Aircraft Company, Inc., Santa Monica, Calif.

No Drawing. Application November 12, 1948, Serial No. 59,777

7 Claims. (Cl. 252—49.9)

This invention relates to a method of improving the properties of a petroleum hydrocarbon lubricating oil and to the resulting composition.

The desirable properties of the silicone oils for the purpose of lubrication are generally well known, and it has been considered highly desirable to be able to dissolve certain of the silicone oils in hydrocarbon lubricating oils to impart desirable properties thereto. This has heretofore not been possible because the silicone oils are not miscible with petroleum hydrocarbon lubricating oils.

In accordance with this invention, the discovery has been made that silicone oils can be dissolved in petroleum hydrocarbon lubricating oils by means of a tri-octyl phosphate and that such incorporation produces the composition of this invention.

Silicone oils or fluids are synthetic relatively high molecular weight liquids, the molecules of which have a skeleton structure of alternating silicon and oxygen atoms bonded one to another with hydrocarbon groups attached to silicon atoms. Silicone oils or fluids may also be regarded as the liquid silicone polymers or polymeric organosiloxanes. These silicone oils or fluids are known and are amply described in the literature, particularly in the following publications: Chemistry of the Silicones, by Eugene G. Rochow, published by John Wiley & Sons, Inc., particularly chapter 4, methyl silicone oil is described on pages 64 to 70; Silicone Oils, Part I: Their Properties, General Electric Review, November 1946, vol. 49, No. 11, pages 14–18, Part II: Their Applications, General Electric Review, December 1946, vol. 49, No. 12, pages 28–33, both articles by Dr. Donald F. Wilcock; Silicone Lubricants, by T. A. Kauppi and W. W. Pedersen, Lubrication Engineering, December 1946, vol. 2, No. 4, page 158, and February-March 1947, vol. 3, No. 1, page 17; Dimethyl-Silicone-Polymer Fluids and Their Performance Characteristics in Hydraulic Systems, by V. G. Fitzsimmons, D. L. Pickett, R. O. Militz, and W. A. Zisman, in Transactions of the A. S. M. E. for May 1946, page 361; Dimethyl-Silicone-Polymer Fluids and Their Performance Characteristics in Unilaterally Loaded Journal Bearings, by J. E. Brophy, R. O. Militz, and W. A. Zisman, in Transactions of the A. S. M. E. for May 1946, page 355, and in references cited therein.

It is well known that such silicone oils or liquid silicone polymers have many properties which make them exceedingly desirable as lubricants. These properties particularly include the relatively small change in viscosity with temperature, especially over a wide range of temperature, high chemical stability even at relatively high temperatures, chemical inertness and unreactivity, low pour point, resistance to shear breakdown, low vapor pressure (especially with volatile fractions removed), high resistance to combustion, inertness toward available natural and synthetic rubbers, and, where the oil contains branched chain molecules by introducing trifunctional groups into the composition before equilibration, the oils have both very low pour points and high reluctance to crystallize or solidify, giving them very desirable low temperature properties. However, it is also known that silicone fluids are lacking in lubricating properties, particularly with respect to extreme pressure and load-carrying capacity, so that in applications involving high rubbing speeds or high unit bearing pressures the results are undesirable. In fact, some silicone oils fail as satisfactory lubricants at pressures somewhat lower than those ordinarily considered to be the initial stages of the extreme pressure range. Such lack of lubricity or oiliness of the silicone fluids, particularly the dimethyl silicone polymer fluids, is especially noticeable where both the loaded surfaces are ferrous, such as steel on steel and steel on cast iron.

In accordance with this invention, it is not only possible to dissolve silicone oil into petroleum hydrocarbon lubricating oil, but in accordance with my invention the resulting composition is also at the same time improved with respect to lubricating properties in which the silicone oil is deficient as pointed out above; that is, particularly with respect to extreme pressure and load-carrying capacity. This is accomplished in accordance with my invention by means of a suitable tri-alkyl phosphate which makes the silicone oil compatible with the petroleum hydrocarbon lubricating oil.

The following examples will illustrate my invention:

Example 1

A composition in accordance with my invention was made up as follows:

1 part by volume DTE light turbine oil
1 part by volume dimethyl silicone polymer (9981–LT–NV–20)
1 part by volume tri(2-ethyl hexyl) phosphate This composition had the following inspection properties:

Viscosity at:
    210° F_____centistokes__ 4.29
    100° F_____do____ 15.2
Pour point_____°F____ 0
Neutralization No_____ 0.06

The dimethyl silicone polymer or methyl silicone oil was obtained from the General Electric Company, Schenectady, New York, under its trade designation 9981-LT-NV-20. It is a methylpolysiloxane liquid containing linear methylpolysiloxanes having molecules of finite length. This and similar silicone oils are described in the trade publication of the General Electric Company, Resin and Insulation Materials Division—Chemical Department, Schenectady, N. Y., entitled "A Comparative Study of G-E Silicone Oils and Petroleum Oils in Hydraulic Applications" and supplemental sheet entitled "Available G-E Silicone Oils." The letters "LT" indicate a silicone oil having extremely low temperature properties. Such a silicone oil is particularly referred to on the third page of the article "Silicone Oils, Part I: Their Properties" by Dr. Donald F. Wilcock, General Electric Review, November 1946, in the second paragraph under the heading "Physical Properties" and in the articles by D. F. Wilcock in The Journal of the American Chemical Society, vol. 68, 1946. The letters "NV" indicate that volatiles have been removed, particularly the small molecules, by vacuum distillation as a step in their manufacture. The numeral "20" indicates the viscosity in centistokes at 100° F.

The DTE light turbine oil was obtained on the market under the trade name Gargoyle DTE light turbine oil and is a highly refined straight hydrocarbon turbine oil having the following properties:

| Viscosity at: | SSU |
|---|---|
| 210° F | 43 |
| 130° F | 84 |
| 100° F | 148-155 |

The dimethyl silicone polymer (9981-LT-NV-20) was not miscible with the DTE light turbine oil without the tri-octyl phosphate, but when the tri-octyl phosphate was shaken with the mixture of dimethyl silicone polymer and DTE light turbine oil a clear solution was obtained.

*Example 2*

70% by volume hydrocarbon lubricating oil fluid (AN-VV-O-366b)
15% by volume dimethyl silicone polymer (9981-LT-NV-70)
15% by volume tri(2-ethyl hexyl) phosphate This composition had the following inspection properties:

| Viscosity at: | | |
|---|---|---|
| 210° F | centistokes | 5.6 |
| 100° F | do | 16.0 |
| —30° F | do | 344 |
| Pour point | °F. below | —60 |
| Neutralization No | | 0.06 |

The dimethyl silicone polymer or methyl silicone oil used in this Example 2 was obtained from the General Electric Company, Schenectady, New York, under its trade designation 9981-LT-NV-70. It is a methyl polysiloxane liquid containing linear methylpolysiloxanes having molecules of finite length. This and similar silicone oils are described in the trade publication of the General Electric Company, Resin and Insulation Materials Division—Chemical Department, Schenectady, N. Y., entitled "A Comparative Study of G-E Silicone Oils and Petroleum Oils in Hydraulic Applications" and supplemental sheet entitled "Available G-E Silicone Oils." The letters "LT" indicate a silicone oil having extremely low temperature properties. Such a silicone oil is particularly referred to on the third page of the article "Silicone Oils, Part I: Their Properties" by Dr. Donald F. Wilcox, General Electric Review, November 1946, in the second paragraph under the heading "Physical Properties" and in the articles by D. F. Wilcock in The Journal of the American Chemical Society, vol. 68, 1946. The letters "NV" indicate that volatiles have been removed, particularly the small molecules, by vacuum distillation as a step in their manufacture. The numeral "70" indicates the viscosity in centistokes at 100° F. This dimethyl silicone polymer, 9981-LT-NV-70 had the following properties:

| | |
|---|---|
| Autogenous ignition temperature (A. S. T. M. D286-30) °F | 810 |
| Viscosity at: | |
| 210° F centistokes | 27.8 |
| 100° F do | 72.7 |
| —30° F do | 510 |

The hydrocarbon lubricating oil fluid (AN-VV-O-366b) was a product obtained on the market as Servo Liquid No. 7. It contained about 89% of a naphthenic hydrocarbon oil, 10% of Acryloid HF-855, and about 1% of an oxidation inhibitor. Acryloid HF-855 is a polymerized alkyl methacrylate having an average molecular weight of about 15,000 and a range of about 7,000 to 20,000, dissolved in 45 per cent by volume of a light petroleum oil of 200° F. flash point, obtained from the Rohm and Haas Company under its trademark designation Acryloid HF-855. This Servo Liquid No. 7 had the following inspection properties:

| | | |
|---|---|---|
| Pour point | °F. below | —60 |
| Viscosity at: | | |
| 210° F | SSU | 44 |
| 100° F | SSU | 77 |
| 0° F | SSU | 450 |
| Neutralization No | | 0.10 |

The dimethyl silicone polymer (9981-LT-NV-70) was not miscible with the hydrocarbon lubricating oil fluid (AN-VV-O-366b) without the tri-octyl phosphate, but when the tri-octyl phosphate was shaken with the mixture of dimethyl silicone polymer and hydrocarbon lubricating oil fluid a clear solution was obtained.

Instead of the tri(2-ethyl hexyl) phosphate, other tri-alkyl phosphates may be used, particularly including those in which the alkyl groups have from about 4 to 10 carbon atoms and in which the alkyl groups are isomeric. These alkyl phosphates particularly include tributyl phosphate, triamyl phosphate, trihexyl phosphate, triheptyl phosphate, tri-octyl phosphate, trinonyl phosphate, trideryl phosphate, tri-isobutyl phosphate, tri-isoamyl phosphate, tri-isohexyl phosphate, tri-isoheptyl phosphate, tri-iso-octyl phosphate, tri-isononyl phosphate, tri-isodecyl phosphate.

I claim:

1. The composition consisting essentially of a petroleum hydrocarbon lubricating oil, normally liquid dimethyl silicone polymer of lubricating viscosity and having both the properties of change of viscosity with temperature and pour point lower than those of said petroleum lubricating oil, but immiscible in said petroleum lubricating oil, the proportion of said normally liquid dimethyl silicone polymer being sufficient to lower the change of viscosity with temperature and pour point of the composition below that of said petroleum lubricating oil, and a sufficient proportion of a trialkyl phosphate to make said dimethyl silicone polymer soluble in the composition.

2. The composition as defined in claim 1 in which the alkyl groups of said trialkyl phosphate have from about 4 to 10 carbon atoms per alkyl group.

3. The composition as defined in claim 1 in which said trialkyl phosphate is tri-octyl phosphate.

4. The composition as defined in claim 1 in which said trialkyl phosphate is tri-(2-ethyl hexyl) phoshate.

5. The lubricating composition containing as an essential lubricating component thereof the lubricant consisting essentially of a petroleum hydrocarbon lubricating oil, normally liquid dimethyl silicone polymer of lubricating viscosity and having the property of change of viscosity with temperature and pour point lower than that of said petroleum lubricating oil, but immiscible in said petroleum lubricating oil, the proportion of said normally liquid dimethyl silicone polymer being sufficient to lower the change of viscosity with temperature and pour point of the composition below that of said petroleum lubricating oil, and a sufficient proportion of a trialkyl phosphate to make said dimethyl silicone polymer soluble in the composition.

6. A composition consisting essentially of substantially equal parts by volume of petroleum lubricating oil, dimethyl silicone polymer having a viscosity of about 20 centistokes at 100° F., and tri-(2-ethyl hexyl) phosphate.

7. A composition consisting essentially of the following ingredients in substantially the following proportions: 70 percent by volume hydrocarbon lubricating oil; 15 percent by volume dimethyl silicone polymer having a viscosity of 70 centistokes at 100° F.; 15 percent by volume tri-(2-ethyl hexyl) phosphate.

DOUGLAS H. MORETON.

REFERENCES CITED

The following references are of record in the file of this patent:

UNITED STATES PATENTS

| Number | Name | Date |
|---|---|---|
| 2,416,504 | Trautman | Feb. 25, 1947 |
| 2,452,319 | Patterson | Oct. 26, 1948 |